(12) United States Patent
Davis

(10) Patent No.: US 6,354,286 B1
(45) Date of Patent: Mar. 12, 2002

(54) BARBEQUE MOUNTING ASSEMBLY FOR VEHICLES

(76) Inventor: Bob Davis, HC 31 Box 35, Elko, NV (US) 89801

(*) Notice: Subject to any disclaimer, the term of this patent is extended or adjusted under 35 U.S.C. 154(b) by 0 days.

(21) Appl. No.: 09/614,299

(22) Filed: Jul. 12, 2000

Related U.S. Application Data

(60) Provisional application No. 60/143,270, filed on Jul. 12, 1999.

(51) Int. Cl.[7] ................................................. F24C 1/16
(52) U.S. Cl. ....................... 126/276; 126/25 R; 126/30; 126/268
(58) Field of Search ................................. 126/276, 268, 126/25 R, 41 R, 56, 24; 108/44; 224/516, 519; 248/231.21; 280/502

(56) References Cited

U.S. PATENT DOCUMENTS

| | | | | | |
|---|---|---|---|---|---|
| 3,032,783 | A | * | 5/1962 | Swanson, Jr. | 126/24 |
| 4,318,501 | A | * | 3/1982 | Graber | 224/516 |
| 4,518,189 | A | * | 5/1985 | Belt | 126/24 |
| 5,626,126 | A | * | 5/1997 | McNulty | 126/276 |
| 5,640,949 | A | * | 6/1997 | Smith | 126/276 |
| 5,950,617 | A | * | 9/1999 | Lorenz | 126/276 |

* cited by examiner

Primary Examiner—James C. Yeung
(74) Attorney, Agent, or Firm—TraskBritt

(57) ABSTRACT

A barbeque grill attachment assembly adapted and structured to secure a barbeque grill to the rear of a vehicle so that the grill may be used without detachment from the vehicle is disclosed. The grill assembly permits the barbeque grill to swing in a horizontal arc from its operational position farthest from the rear of the vehicle to a stowed position adjacent the rear of the vehicle.

10 Claims, 2 Drawing Sheets

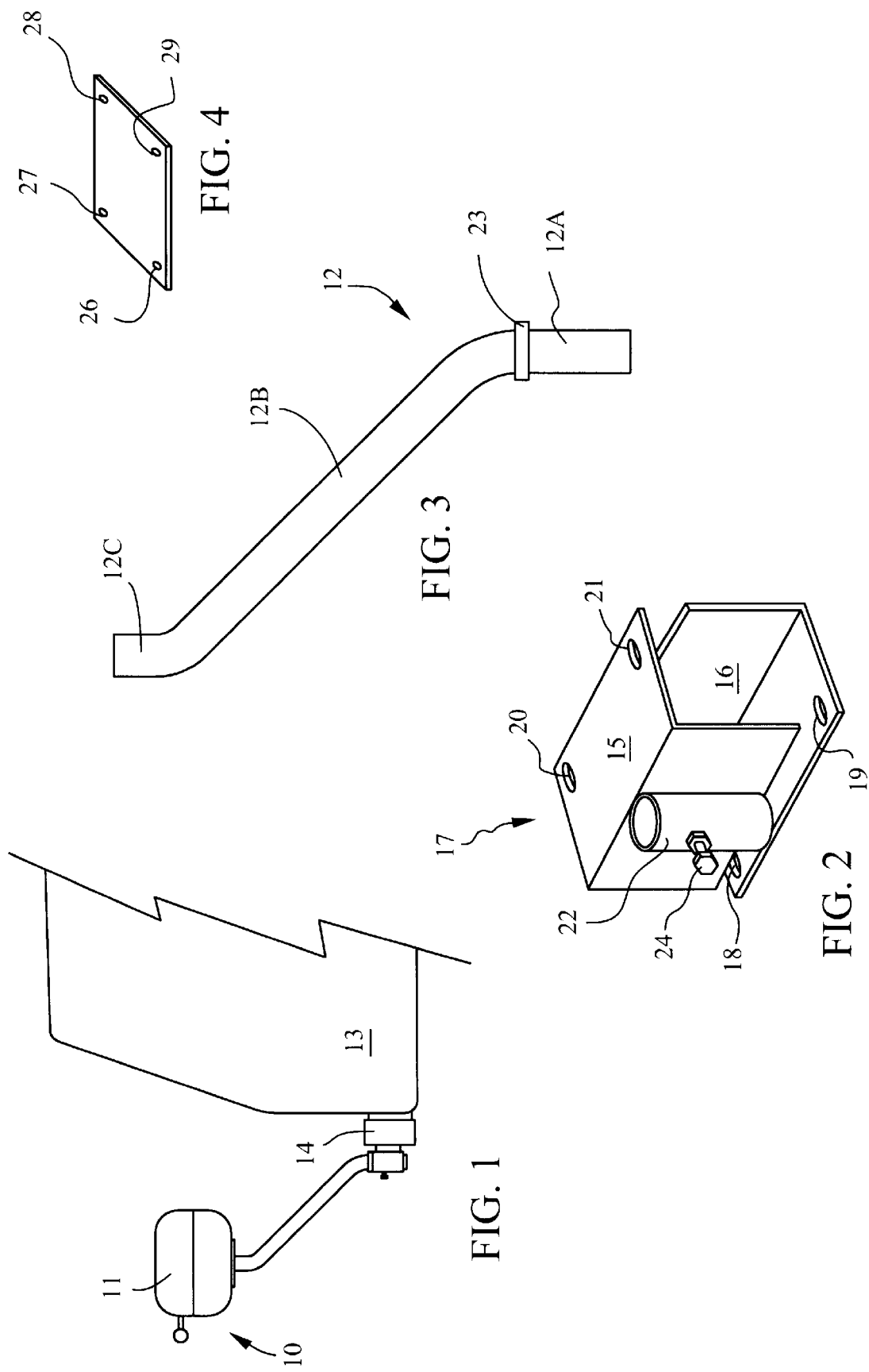

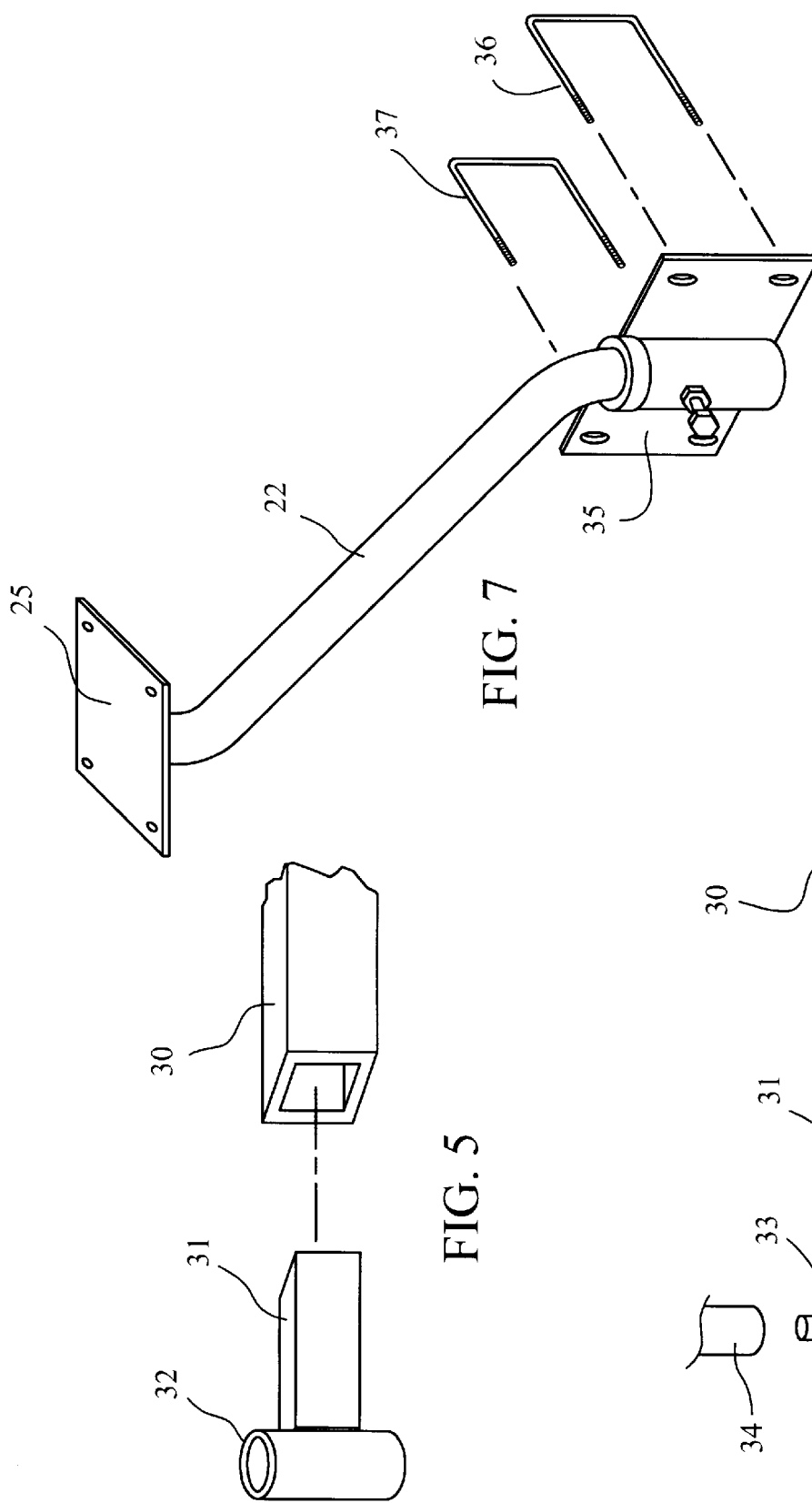

BARBEQUE MOUNTING ASSEMBLY FOR VEHICLES

CROSS REFERENCE TO RELATED APPLICATION

Under the provisions of 35 U.S.C.§ 119(e), priority is claimed from U.S. Provisional Patent Application Serial No. 60/143,270, filed Jul. 12, 1999.

BACKGROUND OF THE INVENTION

FIELD OF THE INVENTION

Support assemblies attachable to vehicle bumpers or trailer hitches, and especially to rotatable support assemblies.

BRIEF SUMMARY OF THE INVENTION

The instant invention relates to a barbeque grill assembly for attaching a barbeque grill to the rear of a vehicle, especially a recreational vehicle, such as a motor home, travel trailer, pickup truck or sport utility vehicle, in a manner such that the barbeque grill can be swung to an operable position, displaced from the rear of the vehicle by a safe distance, about 18 inches to about two feet or more, and then swung to a stored condition or position wherein the grill is substantially adjacent the vehicle.

The assembly comprises bumper attachment means, or if the vehicle is fitted with a trailer hitch, hitch attachment means, and a vertical support member attached to said bumper attachment means. The vertical support member is preferably a hollow, tubular member which is preferably round in cross-section so that said vertical support member, when fitted within a support member holder which is part of or attached to the hitch or bumper attachment means, may be rotated about a vertical axis coexistent with said support member holder.

The upper portion of the vertical member is preferably displaced horizontally from its lower portion which fits within said support holder. The upper portion of the vertical member is attached to or fitted with a grill attachment whereby a barbeque grill can be attached or secured to the upper portion of the vertical support member.

BRIEF DESCRIPTION OF THE SEVERAL VIEWS OF THE DRAWINGS

Drawings are appended hereto to illustrate certain embodiments of the instant invention. Reference to the drawings may facilitate an understanding of the invention.

FIG. 1 is a plan view of a barbeque grill assembly which attaches to the bumper or trailer hitch of a vehicle, especially a recreational vehicle;

FIG. 2 illustrates a mounting bracket for mounting an assembly of the type illustrated in FIG. 1 to the bumper of a recreational vehicle;

FIG. 3 illustrates a vertical support member which is part of the assembly of FIG. 1 and interacts with the mounting bracket of FIG. 2 and a barbeque grill;

FIG. 4 illustrates a grill mount which is fixed, for example, by a weld, to the top of the vertical support member illustrated in FIG. 2 and to the bottom of a barbeque grill;

FIG. 5 illustrates a mounting bar for interacting with a female hitch mount to form a support member for the vertical support member;

FIG. 6 illustrates a structural variation to the mounting bar illustrated in FIG. 5; and FIG. 7 illustrates a flat plate support member attachable to a bumper by a pair of U-bolts.

DETAILED DESCRIPTION OF THE INVENTION

The invention is described in detail by reference to the attached drawings wherein FIG. 1 is an elevational view of said barbeque grill assembly 10 wherein a barbeque grill 11 is attached to a vertical support member 12 in an operating position at a safe distance behind a vehicle 13. The barbeque grill assembly 10 is attached to a rear bumper 14, in this instance, a rear bumper of a motor home or trailer, wherein said bumper 14 has a substantially square cross-section. FIG. 1 illustrates the safe spacing between the grill and the rear of the vehicle when the grill is in an operational position.

FIG. 2 illustrates a bumper attachment means comprising two right angle members 15 and 16 when attached to one another by bolts such as large U-shaped bolts (not shown) from a box-type bracket 17 which fits tightly and securely about a bumper with a substantially square cross-section. Useful U-shaped bolts have a width and length slightly greater than the width and height of said bumper 14. The bolts pass through holes 18, 19, 20 and 21 in the right angle members.

A hollow, tubular support member 22 is secured, e.g., welded, in a vertical position to an outer face of the bumper attachment bracket 17. The hollow, tubular support member 22 is sized and adapted to receive a straight, round rod or pipe (vertical support member) having the structure as illustrated in FIG. 3.

The vertical member 12 has a lower portion 12a, an angled mid-portion 12b and an upper portion 12c. The vertical support member 12 of FIG. 3 generally has a height of about 1½ to 2½ feet. The top portion 12c is displaced horizontally from the bottom portion by a distance of from about 1½ to 2 feet. A bushing 23 is shown securely fixed to the lower portion 12a of the vertical member to ride upon the top of the support holder 22. The lower portion 12a of the vertical support member is rotatable within said support holder. Locking means set screw or jack screw 24 is fitted to the tubular support holder 22 so that when said screw is tightened the vertical support member 12 is prevented from rotating thus fixing the barbeque grill in either an operating position or a travel position adjacent the rear of a vehicle. The bumper, however, may be round or other cross-sectional shape whereby a differently configured bumper attachment means is required.

A flat plate 25 (see FIG. 4) is welded to the top (terminus) of the upper or top portion 12c of the vertical support member 12. Bolt holes 26, 27, 28 and 29 in the flat plate 24 (grill attachment plate) accommodates bolts or machine screws which can pass through the bottom of a barbeque grill to secure the grill to the plate 25 and thus to the entire grill assembly 10.

If the vehicle is fitted with a female hitch mount 30, the tubular support member is fitted (secured) to the rear of a square bar 31 (FIG. 5) wherein the square bar is sized and adapted to fit within the female hitch mount 30. A tubular support member 32 is then fixed vertically to the rear end of said square bar 31 and in a proper position with respect to said bar and to said vehicle to receive the straight lower portion 12c of the vertical support member 12 to support properly the vertical support member and the barbeque grill assembly 10.

Further, as illustrated in FIG. 6, the vertical support member may be a hollow pipe (tubular member) 34 which fits over and rotates about a round rod member 33 fixed to a bar 31 which fits snugly within a female trailer hitch mounting 30.

A mounting plate of the type used in FIG. 7 may be used in place of the angled sheet metal brackets of FIG. 2. The angled sheet metal brackets may be made with vertically opposed holes, top and bottom, so that straight bolts may be used to hold the angled brackets in place on a bumper. The flat support plate 35 is structured and sized to fit flat against the rear of a vehicle bumper. A support tube 22 with an appropriate locking screw is rigidly attached, e.g., by a weld, to the flat support plate 35. Large U-bolts 36 and 37 which are sufficiently wide and long to enclose the width and height of a bumper are used to fasten the support plate securely to the bumper.

The barbeque grill assembly illustrated and described herein is intended for recreational vehicles having a trailer hitch female mount or an exposed bumper. The vehicle may be a motorized vehicle, e.g., a motor home, or a recreational trailer.

The barbeque grill may be a gas grill, e.g., propane or butane, which is commonly used with recreational vehicles for stoves, refrigerators, etc. The grill may be fixed directly to a support plate or the support plate may have a sufficiently large flat area that the grill may be merely set upon such a large support plate and, when cold, is stored elsewhere in said vehicle. Such a large support plate may be pivotally attached to the vertical support member so that it may be folded to fit flat against the rear of a vehicle to which the grill assembly is attached.

The grill assembly is structured and adapted to be fixed in an operational condition a safe distance to the rear of a vehicle, or if the mounting bracket is near one end of the bumper, to the side of such a vehicle. The grill assembly is designed to rotate about a vertical axis proximate the bumper or vehicle hitch so that the grill may be rotated to a storage position proximate to the rear surface of the vehicle.

The barbeque grill itself may be a regularly shaped grill or the grill may be narrow and elongated so that its longer length fits more flush with the rear surface of the vehicle and the width of the grill is such that the grill does not extend to the rear beyond the bumper.

The locking screws are provided to lock the grill in either the operational or storage position.

The grill attachment plate may be rotatably mounted on the vertical support member so that the barbeque grill may rotate with respect to the vertical support member. Thus, the grill may be rotated substantially horizontally vis-a-vis the vertical support member so that the grill may be opened to either side or to the rear. This feature may be desirable on windy days when it is desired to open the grill to leeward.

The vertical support member preferably has an extended angled mid portion since many recreational vehicles, including many SUJs, have a rear tire centrally mounted on or near the central rear portion of the vehicle. Thus, the lower portion of the vertical support member projects upward only a short distance before the angled mid-portion begins. Thus, angled mid-portion does not contact the spare tire of the vehicle when the assembly is in a stored position proximate the rate of the vehicle.

The scope of the invention, however, is intended to be such that the vertical support member may be any desirable shape which facilitates rotation of the whole support assembly and in operational position which places the barbeque grill a safe distance from the rear or from the side of the vehicle and then to a storage position essentially flush with the rear surface of the vehicle.

Having a grill mounted securely to a recreational vehicle has many advantages. The grill need not be stored in the vehicle, which means that the grill may be rotated to a storage (traveling) position while warm. Second, storage of a greasy, smoky grill within a vehicle may soil the vehicle. Third, the grill has its own support and is thus freestanding and may be quickly operated. These features are desirable especially when the grill is to be used in primitive camping areas without tables, fireplace or campfire facilities. Thus, the grill of the instant invention is at a convenient height for cooking and at a height where dirt, etc. will not be accidentally kicked onto the food on the grill nor will the grill get accidentally knocked over.

While the invention has been described herein as an assembly for attachment to the rear of a vehicle, the grill assembly could, if desired, be attached to the front of a vehicle having an appropriate bumper.

The grill assembly may be easily removed by loosening the locking screw sufficiently that the vertical support member may be removed from hollow, tubular support member or the support bar readily removed from a female hitch mount. Thus, if the recreational vehicle has only seasonal use, the barbeque grill assembly may be readily and easily removed from the vehicle.

What is claimed is:

1. A movable grill assembly attachable to a vehicle for supporting a barbecue grill comprising:

vehicle attachment means for holding a vertical support member in various positions with respect to a trailer hitch of a vehicle;

vertically-oriented holder means fixed to said vehicle attachment means for rotatably mounting said vertical support member to said trailer hitch in a manner that said vertical member is rotatable within or about said holder means;

a vertical support member having a lower, straight portion fitting within or about said vertically-oriented holder means and an upper portion displaced horizontally from said lower straight portion; and barbeque grill attachment means attached to said upper portion of said vertical support member, said grill attachment means and vertical support member rotatable within or about said vertically-oriented holder means to place said grill attachment means in a first operational position at a point of farthest displacement from the rear of said vehicle and at a second storage position substantially adjacent the rear of said vehicle.

2. The movable grill assembly of claim 1, wherein said vertically-oriented holder is a hollow tubular member with an interior diameter sufficient to accept a vertical support member having a round cross-section.

3. The movable grill assembly of claim 1, wherein said vertically-oriented holder is a rod having a round exterior to accept a vertical support member having a tubular configuration and a hollow, round interior.

4. The movable grill assembly of claim 1, wherein said vertically-oriented holder has a locking screw adapted and sized to have a locking position to press against said vertical support member to lock the vertical support member to prevent its rotation.

5. The movable grill assembly of claim 1, wherein said vertical support member has a lower vertical portion adapted and sized to operationally cooperate with said vertically-oriented holder, an angularly oriented mid-portion sized to displace the vertical top portion of said vertical support member both vertically and horizontally from its said lower vertical portion a sufficient distance from said vehicle for safe operation of said barbeque grill.

6. The movable grill assembly of claim 5, wherein said horizontal displacement distance is at least about 1½ feet.

7. The movable grill assembly of claim 1, wherein said barbeque grill attachment means is a flat plate sized and adapted to support a grill attached to said flat plate.

8. The movable grill assembly of claim 1, wherein said assembly is sized and constructed to position said grill in an operational position and a storage position which are in substantially the same horizontal plane.

9. The movable grill assembly of claim 1, wherein the vehicle attachment means is a boxlike bracket assembly sized and adapted to fit securely around a vehicle bumper.

10. The movable grill assembly of claim 1, wherein said vehicle attachment means is a bar member sized and adapted to fit cooperatively within a female trailer hitch mount of said vehicle.

* * * * *